April 15, 1941. T. F. PEARSON 2,238,283
SHEARING MEANS
Filed Sept. 15, 1936 2 Sheets-Sheet 2
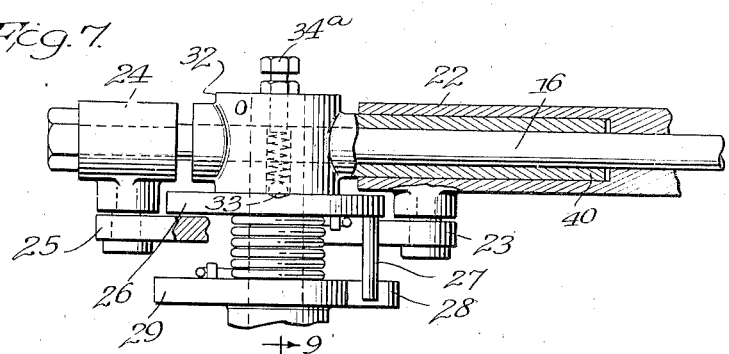
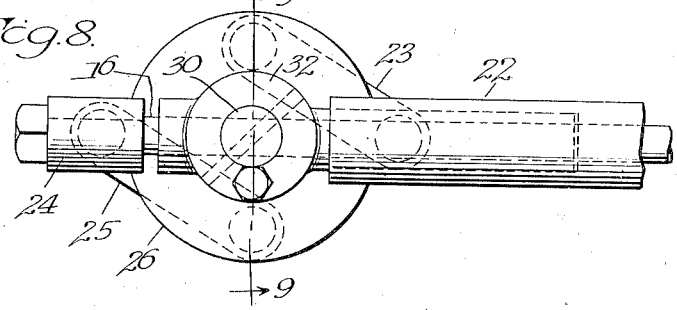
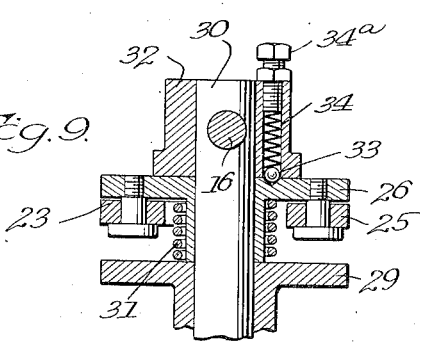
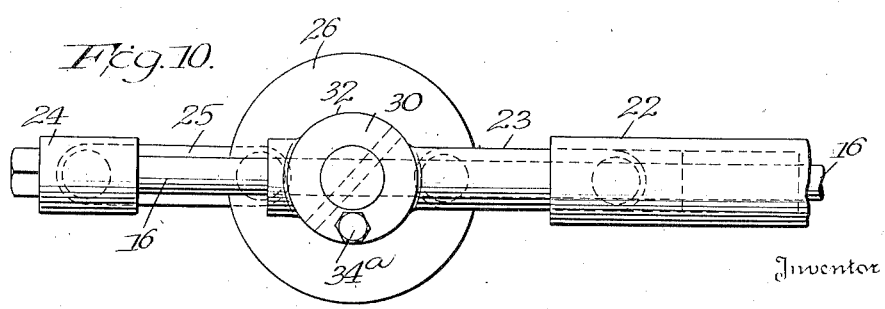
Inventor
Thomas F. Pearson Patented Apr. 15, 1941

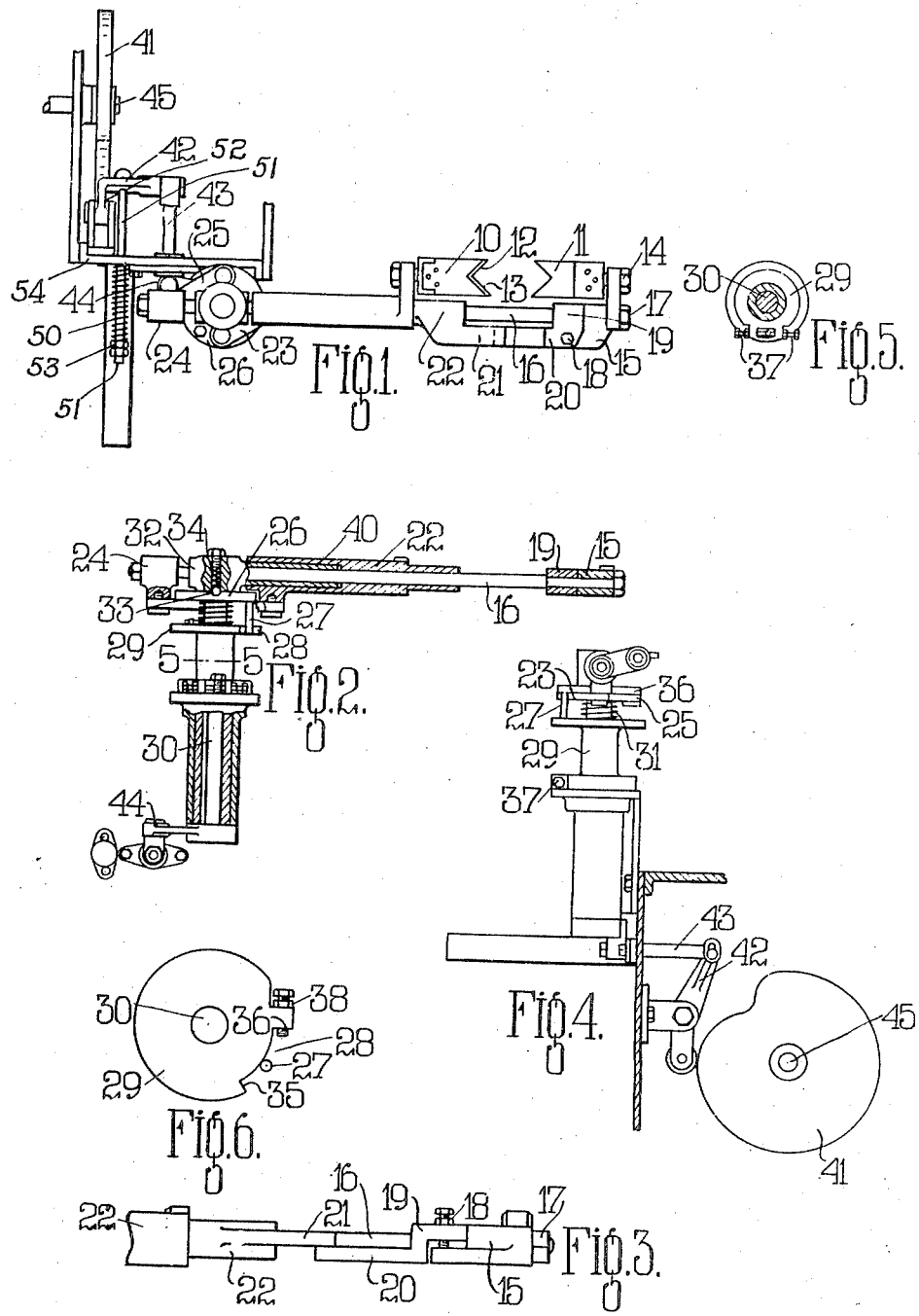

2,238,283

UNITED STATES PATENT OFFICE 2,238,283

SHEARING MEANS

Thomas Finney Pearson, Pontefract, England, assignor to Crown Cork & Seal Company, New York, N. Y., a corporation of New York Application September 15, 1936, Serial No. 100,939
In Great Britain September 23, 1935

14 Claims. (Cl. 49—14)

The present invention relates to the manufacture of glass bottles, jars or the like articles of hollow ware, and has for its object the provision of simple yet efficient means for severing of the ends of a mould charge, such as for example when picked up by a suction mould from a hearth or furnace, prior to delivery of said charge to a parison or other mould in which the bottle or the like article is formed.

Although not confined to such use, the shearing mechanism of the present invention is preferably used with a suction gathering device of the type shown in my copending applications, Serial Nos. 16,919 and 16,920, filed April 17, 1935 which have matured into U. S. Patents Nos. 2,134,733 and 2,134,734, respectively. The form of the invention shown in the accompanying drawings is particularly adapted for such use, but it must be understood that certain features of the invention can be utilized with a standard suspended gob type feeder, or as a shear for suction feed machines of the Owens type.

According to the present invention a pair of reciprocating blades for shearing purposes are mounted on a single arm common to both blades, whilst in a further feature of the present invention the blades reciprocate linearly as distinct from having an arcuate path of movement.

The invention is more particularly described with reference to the accompanying drawings in which:

Figure 1 is a plan view of a pair of shear blades and their operating mechanism.

Figure 2 is a corresponding elevational view chiefly in section of the shear blade arm and the operating mechanism.

Figure 3 is a side elevational view of the shear blade arm and the shear blades thereon.

Figure 4 is an end elevational view.

Figure 5 is a section on the line 5—5 of Figure 2.

Figure 6 is a plan view of the bracket forming part of the operating mechanism for relative reciprocation of the shear blades.

Figure 7 is an enlarged detail view, similar to Figure 2, showing certain parts in section and others in elevation.

Figure 8 is an enlarged plan view, similar to Figure 1.

Figure 9 is a sectional view taken on line 9—9 of Figure 8.

Figure 10 is a plan view, similar to Figure 8, but showing the parts in the closed position of the shears.

In the drawings, blades 10 and 11 each have a pair of cutting edges 12, 13, arranged in V-shaped formation, so that as the blades 10, 11 approach each other, with the V-shaped recesses forming in combination a rectangular opening beneath a mould charge, which opening is reduced in area as the blade elements are brought nearer together, the periphery of the charge is engaged by the cutting edges 12, 13 of the blades at diametrically opposed points i. e. four in all, whereby any tendency for lateral displacement of the mould charge at the instant of contact of the charge by the shears is prevented.

The blade 11 is adjustably mounted by means of a nut 14 on a bracket 15 which in turn is adjustably mounted on a rod 16 by means of a nut 17. The angular position of the bracket 15 about the axis of the arm 16 is adjusted by means of a screw 18 which passes through a stepped bracket 19 and contacts with the bracket 15, the lower limb 20 of the bracket 19 being adapted for sliding engagement with a limb 21 of a bracket 22 slidably mounted on the rod 16, which bracket 22 carries the blade 10.

The limb 21 of the bracket 22 forms a guide for the brackets 19, 15 to maintain a parallelism of travel of the blades 10, 11 during the shearing operation, whilst the spacing apart of the planes of displacement of the shear blades may be varied by the screw 18 to suit particular requirements, that is to say when the blades 10, 11 move linearly towards one another they may either have face to face contact or their faces may be separated by any desired amount within limits.

Both the brackets 19 and 22 are partly of sleeve-like form around the rod 16, the bracket 22 being pivotally connected to a toggle link 23, and a boss 24 rigid with the rod 16 being connected to a toggle link 25. Thus one blade assembly consists of the elements 11, 15, 19 and 20 and the other blade assembly comprises the blade 10, and the bracket 22 and portion 21.

The opposite ends of the toggle links 23, 25 are pivotally connected at diametrically opposed points to a rotary disc 26, which carries a depending pin 27, the lower end of which engages in a slot 28 of a fixed bracket 29 surrounding a vertical spindle 30. A coiled spring 31 is anchored at one end to one radial face of the bracket 29, and at its other end to the lower radial face of the disc 26 to create a torsional load applied on rotation of the disc 26 relative to the bracket 29. The rod 16 passes through a sleeve 40 which is carried by a head or boss 32 secured to the upper end of the spindle 30 and is shrouded by the bracket 22. This head or boss 32 is held against the disc 26 by the pressure of the coiled spring 31 and carries a spring 34 adapted for maintaining a ball 33 in engagement within a depression in the disc 26. This spring 34 is of lighter construction than the spring 31. The load on the spring is adjusted by the screw 34a. The boss 32 thus rotates with the spindle 30, and the disc 26 is forced to rotate with the boss by the pressure exerted by the spring 34 on the ball until the pin 27 strikes the end 36 of the slot 28 in the stationary bracket. Continued rotation of the spindle 30 then causes the ball 33 to rise out of the recess thus permitting the disc 26 to rotate in the reverse direction under the action of the spring 31. The ball 33 and spring 34 are mounted within the boss 32 at a position radially outwardly of the spindle 30.

Any desired means may be employed for oscillating the spindle 30 about its own axis, such as for example a cam 41, lever 42, link 43 and lever 44, the cam being mounted on a shaft 45 driven in synchronism with other parts of a glass feeding and forming machine from a prime mover (not shown).

Although the bracket 29 is fixed, its angular position about the spindle 30 may be adjusted by means of adjusting screws 37 to vary the tension on the spring 31 so that the position of the slot 28 and the load on the spring 31 in the operative position of the rod 16 consistent with the open position of the blades may be varied.

In operation when the shearing device as a whole is approaching the shearing position, that is to say, the mould is above the furnace and is picking up a charge, the spindle 30 is rotated about its own axis and as a result disc 26 and the boss 32 are angularly displaceable in unison about the axis of the spindle 30 with the depending pin 27 of the disc at one end of the slot 28 in the fixed bracket 29. This causes rotation of the swinging arm consisting of the rod 16, the sleeve 40 and brackets 22 and 19 and the blades bodily as a unit about the axis of the spindle in order to bring the shears to the required position.

During this rotation, the pin 27 moves from the end 35 of the slot 28 to the end 36 thereof, which end is adjustable by means of a nut 38. By virtue of such relative displacement between the disc 26 and the bracket 29 the helical spring 31 is tensioned and when the pin 27 reaches the end 36 of the slot 28 and further rotation of the disc 26 is prevented, the spring loaded ball 33 is raised and the boss 32 is separated from the disc 26. Under the action of the spring 31 the disc 26 is caused to return independently of reverse rotation of the spindle. By virtue of the relative rotation of the disc 26 and the boss 32, the links 23, 25 are displaced from the position shown in Figures 1 and 3, i. e., at an angle to the rod 16 into the position shown in Figure 10 and thus cause relative displacement of the brackets 22, 15 to effect relative displacement of the blades 10 and 11 longitudinally of the arm to effect shearing. On the return movement of the spindle 30 about its own axis displacement of the toggle links in the reverse direction is effected to open the shear blades. While the pin 27 takes up its original position in the slot 28, the trip mechanism is re-set.

Thus the arm 16 and its associated brackets 15, 19 and 22 move in unison about the axis of the spindle 30 during angular displacement of the latter to bring the shears into the shearing position whereupon, by virtue of the trip mechanism, constituted by spring 31 and the pin and slot connection between the disc 26 and the bracket 29 for causing displacement between the disc 26 and the spindle 30, the blades are then relatively reciprocated axially of the rod 16 to effect shearing.

From a consideration of Figures 1, 2 and 3, it will be understood that the spindle 30 and the parts carried thereby are oscillated in one direction by the cam 41 acting on the roller associated with the lever 42. The lever 42, the spindle 30 and the associated parts are swung back to their original position by a spring 50 surrounding a rod 51 connected at 52 to the laterally bent offset portion of the lever 42, as shown in Figure 1. The spring is disposed between the adjustably mounted lock nuts 53 at one end of the rod and a side bracket 54, which carries the lever 42 and the connected parts. Thus, the spring 50 serves to maintain the roller on the lower end of the lever 42 in contact with the periphery of the cam 41 at all times.

I declare that what I claim is:

1. A shearing mechanism for glass feeding machines, comprising an arm mounted for swinging movement about an axis adjacent one end of the arm, means for swinging said arm about said axis, a pair of oppositely disposed blades on said arm, and means for relatively moving said blades to effect a shearing operation, said means comprising power storage means, connections transmitting energy thereto from the arm upon swinging movement thereof, means for releasing the power in said power storage means at a predetermined point in the swinging movement of the arm, and connections transmitting the released power to the blades.

2. A shearing mechanism for glass feeding machines comprising an arm mounted for swinging movement about an axis adjacent one end of the arm, means for swinging said arm about said axis, a pair of oppositely disposed blades on said arm, and means for relatively displacing said blades in linear path to effect a shearing operation, said means comprising a spring arranged to be tensioned by the swinging movement of said arm in one direction, operative connections between said spring and said blades, and means to release said spring and to transmit the tension thereof to said shears to operate the latter when the arm has reached a predetermined point in its swinging movement.

3. A shearing mechanism for glass feeding machines, comprising an arm, means for angularly displacing said arm about a fixed, vertical axis normal thereto, a pair of blades in face to face relationship mounted on said arm remote from said axis, and means to relatively displace said blades longitudinally of said arm for shearing purposes, comprising a spring, means for tensioning the spring, means for releasing the spring at a predetermined point in the swinging movement of the arm, and connections between the spring and the blades, whereby the blades are displaced upon release of the spring.

4. A shearing mechanism for glass feeding machines, comprising an arm, means for angularly displacing said arm about a fixed, vertical axis normal thereto, a pair of blades in face to face relationship mounted on said arm remote from said axis, a spring deriving power from said arm displacing means for relatively linearly displacing said blades, and means operable at a predetermined position of angular displacement of said arm for releasing said spring and thereby displacing said blades.

5. A shearing mechanism for glass feeding machines, comprising an arm, a spindle on which said arm is mounted adjacent one of its ends, means for rotating said spindle, a pair of oppositely disposed blades on said arm adjacent the other end of the arm, and means for relatively reciprocating said blades longitudinally of said arm at a predetermined position of rotation of said spindle, said reciprocating means comprising spring means resisting rotation of the spindle in one direction and disposed to accumulate energy therefrom and connections serving to transmit said energy to reciprocate the blades at said predetermined position.

6. A shearing mechanism for glass feeding machines, comprising an arm, a spindle on which said arm is mounted adjacent one of its ends, means for rotating said spindle, a pair of oppositely disposed blades on said arm adjacent the other end of the arm, toggle lever mechanism for relatively reciprocating said blades longitudinally of said arm, resilient means for actuating the toggle lever mechanism, and means rendering said resilient means effective at a predetermined position of angular rotation of said spindle.

7. A shearing mechanism for glass feeding machines, comprising an arm, a pair of oppositely disposed blades supported for sliding movement with respect to said arm, a spindle extending in a direction normally of said arm and to which said arm is fixed, means for rotating said spindle and for swinging said arm, a disc on said spindle mounted for rotation therewith and for rotation relative thereto, a releasable connection between said arm and said disc, links connected between said disc and said blades, means for releasing said connection between said arm and said disc at a predetermined point in the rotation of the spindle, and means to rotate the disc when so released, to operate said links and to move said blades.

8. A shearing mechanism for glass feeding machines, comprising a vertically disposed spindle mounted for rotation about its axis, a laterally projecting arm secured to the one end of the spindle for swinging movement about the axis of the spindle, shear blades supported by said arm for longitudinal movement with respect thereto for shearing action, a toggle element associated with said spindle for rotation therewith and for rotation with respect thereto, a releasable connection between said spindle and said element adapted to impart rotation thereto upon rotation of said spindle, a spring connected to said element and disposed to resist such rotation, toggle links operatively disposed between said elements and said shear blades, and means for releasing said releasable connection at a predetermined point in the rotation of said spindle and in the swinging movement of said arm, to permit said spring to rotate said element with respect to the spindle and the arm to actuate said shears.

9. A shearing mechanism for glass feeding machines, comprising a spindle mounted for rotation about a vertical axis, a laterally projecting arm secured to the spindle for swinging movement about the axis of the spindle, shear blades mounted for longitudinal reciprocating movement with respect to said arm, an element surrounding said spindle and mounted for rotation therewith and for rotation with respect thereto, a releasable connection between said arm and said element, a spring connected to said element and disposed to be placed under tension upon rotation of said element with said spindle, connections between said element and said shear blades to effect movement of the latter upon relative rotation between said element and said spindle, and means for releasing said releasable connection at a predetermined point in the swinging movement of said arm to permit the tension of said spring to rotate said element with respect to the spindle to actuate the shears.

10. A shearing mechanism for glass feeding machines, comprising a spindle mounted for rotation on a vertical axis, a laterally projecting arm secured to the spindle for swinging movement about the axis thereof, shear blades longitudinally movable relative to the arm for shearing action, a disc journalled on said spindle, operative connections between said disc and said shear blades to move the latter upon relative rotation between the disc and arm, a spring-pressed latch connection adapted to transmit rotation from the arm to said disc, a stationary bracket, a coil spring interconnecting said bracket and disc and disposed to be tensioned upon rotation of the disc relative to the bracket, and means for releasing said spring-pressed latch connection at a predetermined point in the swinging movement of said arm, to permit the tension of said spring to rotate said disc relative to said arm and thereby actuate said shears.

11. A shearing mechanism for glass feeding machines, comprising a spindle mounted for rotation on a vertical axis, a laterally projecting arm secured to the spindle for swinging movement about the axis thereof, shear blades supported by and longitudinally movable with respect to the arm for shearing action, a disc journalled on said spindle, operative connections between said disc and said shear blades to move the latter upon relative rotation between the disc and arm, a spring-pressed latch connection adapted to transmit rotation from said arm to said disc, a stationary bracket, a coil spring interconnecting said bracket and disc and disposed to be tensioned upon rotation of the disc relative to the bracket, and abutment means operative after a predetermined extent of the swinging movement of said arm, to arrest the rotation of said disc therewith, said spring-pressed latch being released by the arresting of the rotation of the disc, thereby permitting the tension of said spring to rotate the disc relative to said arm and actuate the shears.

12. A shearing mechanism for glass feeding machines, comprising a substantially horizontal arm mounted for swinging movement about a fixed vertical axis adjacent one of its ends, a pair of blades each having cutting edges disposed in V-shaped relationship and each mounted for reciprocating action on lines parallel to the axis of the arm, means for swinging the arm about the vertical axis, spring means arranged to be tensioned by the swinging movement of the arm, connections between the spring means and the shears, means releasing the spring means to reciprocate the shears at a predetermined point in the swinging movement of the arm, and means for adjusting the point when the last-mentioned means is rendered effective.

13. A shearing mechanism for glass feeding machines, comprising a spindle mounted for oscillation on a fixed vertical axis, a shearing assembly projecting laterally from and carried by one end of the spindle for swinging movement about the axis thereof, means for oscillating the spindle and swinging the shearing assembly, and means for actuating the shears at a predetermined point in the oscillation of the spindle, said last named means comprising a spring for accumulating energy derived from the oscillation of the spindle in one direction, and means rendered operative at said predetermined point for releasing the spring and transmitting said accumulated energy to actuate the shears.

14. A shearing mechanism for glass feeding machines, comprising an arm mounted for swinging movement in a horizontal plane about a vertical axis, means for swinging said arm in a regular cycle back and forth about said axis, brackets carried by the arm for straight-line relative sliding movement longitudinally of the arm toward and from each other, shear blades rigidly mounted on said brackets with their cutting edges facing each other, means for adjusting the position of one of said blades relative to its supporting bracket and to the other blade, to vary the shearing clearance between the blades, and means for reciprocating said brackets and the blades carried thereby toward one another at a predetermined point in each swinging movement of said arm in one direction to effect a shearing operation by said blades.

THOMAS FINNEY PEARSON.